Patented July 22, 1941

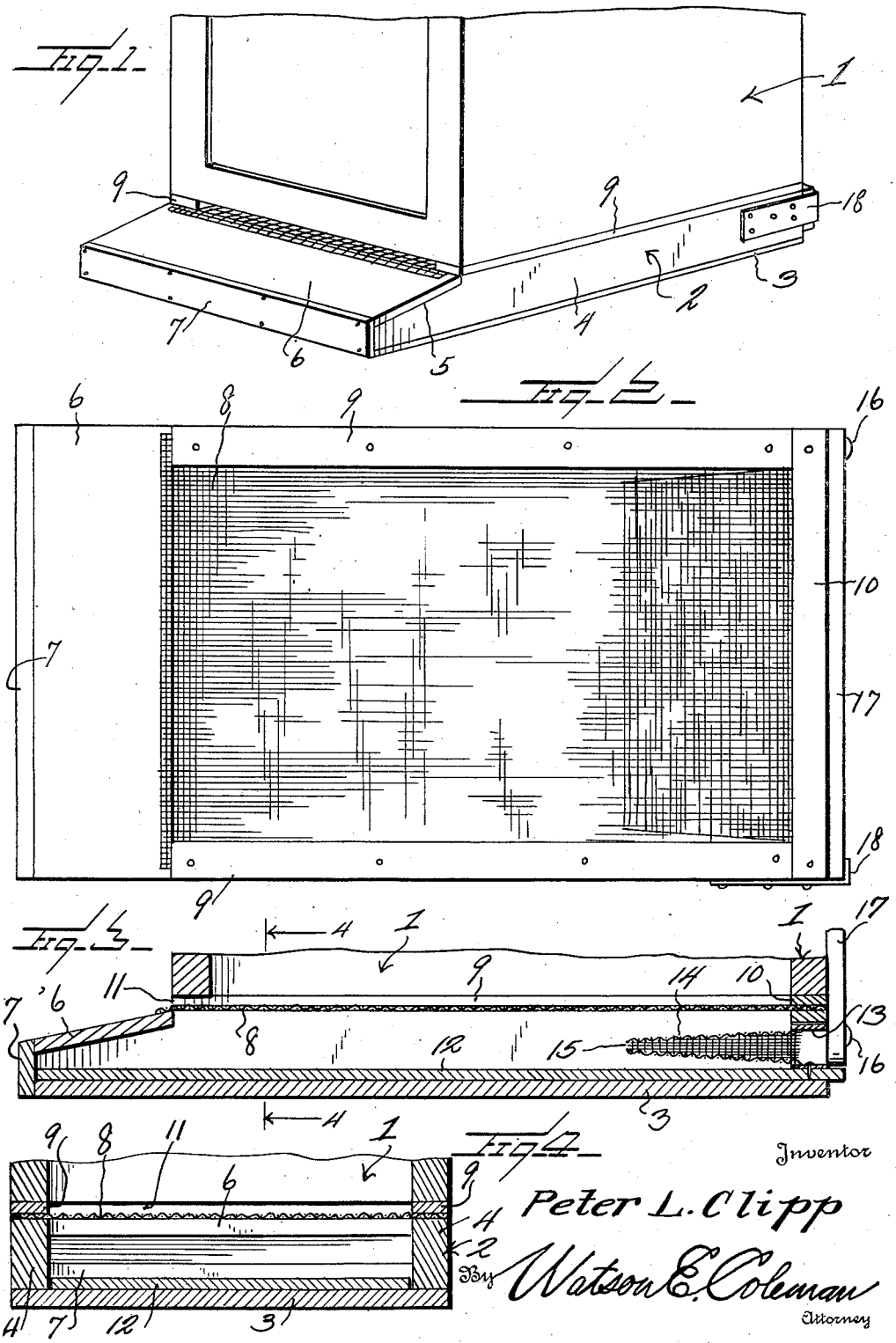

2,250,152

UNITED STATES PATENT OFFICE 2,250,152

MOTH TRAP FOR BEEHIVES

Peter L. Clipp, Cedaredge, Colo.

Application March 25, 1941, Serial No. 385,165

4 Claims. (Cl. 6—4)

This invention relates generally to the class of bee culture and pertains particularly to improvements in hive construction.

The primary object of the present invention is to provide a means for use in association with a bee hive of trapping pests such as the yellow jacket and the miller moth, or any other pests which get into the hives and destroy the bees.

A further and more specific object of the invention is to provide an insect trap for bee hives which forms a part of the bottom board or hive stand and which is constructed in such manner that insect pests attempting to enter the hive by way of an opening in the stand will be effectively trapped and may be readily destroyed.

The invention will be best understood from a consideration of the following detailed description taken in connection with the accompanying drawing, it being understood, however, that the invention is not to be considered as limited by the specific illustration or description but that such illustration and description constitutes a preferred embodiment of the invention.

In the drawing:

Fig. 1 is a view in perspective of the lower portion of a bee hive showing the improved hive stand trap of the present invention.

Fig. 2 is a view in top plan of the trap.

Fig. 3 is a vertical longitudinal section through the trap and the lower portion of the hive.

Fig. 4 is a section on the line 4—4 of Fig. 3.

Referring now more particularly to the drawing, the numeral 1 generally designates the lower part of a hive while the numeral 2 designates as a whole, the hive stand and insect trap of the present invention.

The hive stand and trap comprises a relatively flat hollow structure having a bottom board 3 which is of an overall length materially greater than the length of the hive from the front to the rear, as shown in Fig. 1, and vertical side walls 4 which extend lengthwise of the bottom at the sides thereof, and each of which at its forward end top edge has an obliquely cut portion 5 for the support of the inclined alighting board 6. Between the forward edge of the alighting board and the forward edge of the bottom 3 is a front wall 7 and from the rear edge of the alighting board to the rear of the hive stand, the stand is open but is covered with a screen 8. Secured along the top of each side wall 4 over the side edges of the screen 8 are the side cleats 9 and a corresponding cleat 10 extends across the back of the stand, as shown in Fig. 2. These cleats 9 and 10 support the hive body and maintain the front lower part of the hive spaced above the rear edge of the alighting board to provide the bee entrance and exit opening 11. Lying upon the top of the bottom board 3 of the hive stand is a removable floor board 12, which extends the full length of the bottom 3 and has a portion at its rear end extended beyond the floor board, as shown in Fig. 3, to provide a readily grasped portion which facilitates sliding the floor out through the open back of the stand.

Secured transversely of the floor board 12 is a metal collar or frame 13, the width of which is equal to or only slightly less than the interior width of the stand between the walls 4 and which has a height substantially equal to the height of the rear opening of the stand.

Connected with the inner side of this opening or door frame 13 is a wire screen vestibule which at its rear end is of the height and width of the door frame and which is of gradually reduced height and width toward its forward end which is open, as indicated at 15. The edges of this screen vestibule at the forward end 15 are in relatively close proximity so that an insect may pass somewhat freely through the vestibule and into the interior of the hollow stand, but will be prevented from returning through the vestibule to leave the stand.

The screen 8 covering the open top of the stand, of course, prevents the insects which have been trapped from getting up into the hive, but permits gum or other refuse from the hive to pass through and be caught in the trap, so that the trap thus functions also as a means of keeping the hive sanitary.

At one side of the stand there is pivotally secured to an end wall by means of a pin 16, a swinging door 17 which closes the door frame 13 and is maintained in place by a catch or hook 18 which is attached to the opposite side of the frame from the pivot.

From the foregoing, it will be readily apparent that the present improved insect trap provides a convenient accessory for the hive by utilizing the regular stand thereof and it may be cleaned when necessary merely by withdrawing the floor 12, without disturbing the stand or the hive.

What is claimed is:

1. A hive stand trap structure, comprising a relatively flat hollow body, a foraminous top wall for the body, said body being designed to support a bee hive over said top wall, means forming an insect pest entrance opening through a wall of the hive stand, a floor disposed within the hive stand and removable through said entrance opening, and a foraminous vestibule structure having a rear side secured to the floor in said entrance opening to be carried by the floor and having a forward open side, said vestibule structure being constricted toward the forward open side whereby the wire edges thereof are brought into close relation to prevent the return of insects through the vestibule from the hive stand after they have passed into the hive stand through the said forward opening.

2. A hive stand trap structure, comprising a relatively flat hollow body, a foraminous top wall for the body, said body being designed to support a bee hive over said top wall, means forming an insect pest entrance opening through a wall of the hive stand, a floor disposed within the hive stand and removable through said entrance opening, a foraminous vestibule structure having a rear side secured to the floor in said entrance opening to be carried by the floor and having a forward open side, said vestibule structure being constricted toward the forward open side whereby the wire edges thereof are brought into close relation to prevent the return of insects through the vestibule from the hive stand after they have passed into the hive stand through the said forward opening, and a door hingedly attached to a wall of the hive stand to be moved into closed position across the rear of the floor to cover and close said entrance opening and maintain the floor against removal.

3. A hive stand insect pest trap, comprising a flat hollow body, a top wall for the body formed of foraminous material, the body being designed to support a bee hive, said body having an entrance opening through its rear side, a removable floor insertible into the body through said entrance opening, a door frame carried by the removable floor to position in said entrance opening, an entrance vestibule formed of screen wire and having a rear open side and a forward open side, the rear open side of the vestibule being secured in said frame, said vestibule being of decreasing height and width from its rear to its forward side whereby the edges of the screen material at the forward opening are in relatively close proximity and functioning to prevent insects passing outwardly from the hive stand through the vestibule after they have been trapped in the stand.

4. A hive stand insect pest trap, comprising a flat hollow body, a top wall for the body formed of foraminous material, the body being designed to support a bee hive, said body having an entrance opening through its rear side, a removable floor insertible into the body through said entrance opening, a door frame carried by the removable floor to position in said entrance opening, an entrance vestibule formed of screen wire and having a rear open side and a forward open side, the rear open side of the vestibule being secured in said frame, said vestibule being of decreasing height and width from its rear to its forward side whereby the edges of the screen material at the forward opening are in relatively close proximity and function to prevent insects passing outwardly from the hive stand through the vestibule after they have been trapped in the stand, said removable floor at its rear end projecting beyond the rear of the hive stand to form a grasping means facilitating the removal of the floor and vestibule attached thereto, and a door pivotally attached to the body of the stand at one side of said entrance opening, and adapted to be moved into closing position with respect to the entrance opening.

PETER L. CLIPP.